(12) United States Patent
Ohira et al.

(10) Patent No.: US 6,202,702 B1
(45) Date of Patent: Mar. 20, 2001

(54) ACOUSTIC DAMPING PIPE COVER

(75) Inventors: Yasuyuki Ohira, Seki; Mitsuo Hori, Gifu, both of (JP)

(73) Assignee: Shishiai-Kabushikigaisha, Gifu (JP)

( * ) Notice: Subject to any disclaimer, the term of this patent is extended or adjusted under 35 U.S.C. 154(b) by 0 days.

(21) Appl. No.: 09/507,090

(22) Filed: Feb. 18, 2000

(51) Int. Cl.$^7$ ...................................... F16L 9/21
(52) U.S. Cl. ...................... 138/149; 138/141; 181/224
(58) Field of Search ........................ 138/148, 149, 138/141; 181/224, 227, 228, 246, 252, 282

(56) References Cited

U.S. PATENT DOCUMENTS

| | | | | |
|---|---|---|---|---|
| 3,900,648 | * | 8/1975 | Smith | 428/71 |
| 4,190,131 | * | 2/1980 | Robinson | 138/149 |
| 4,231,436 | * | 11/1980 | Waller | 138/149 |
| 4,239,064 | * | 12/1980 | Gilman | 138/149 |
| 4,304,268 | * | 12/1981 | Gilman | 138/149 |
| 4,614,016 | * | 9/1986 | Laing et al. | 138/149 |
| 4,634,615 | * | 1/1987 | Versteegh et al. | 138/141 |
| 4,874,648 | * | 10/1989 | Hill et al. | 138/172 |
| 4,878,520 | * | 11/1989 | Nakamura et al. | 138/149 |
| 4,915,139 | * | 4/1990 | Landry et al. | 138/125 |
| 5,548,093 | * | 8/1996 | Sato et al. | 138/121 |

\* cited by examiner

*Primary Examiner*—James Hook
(74) *Attorney, Agent, or Firm*—Cantor Colburn LLP

(57) ABSTRACT

A generally tubular laminated acoustic damping pipe cover to be used on a water pipe to reduce the noise level of the pipe, having a sound insulation layer whose area density is 1.5–5.0 kg/m2 and a sound absorptive layer whose thickness is 4.0–10.0 mm, covered with a heat-contractile film which when heat treated will tighten the acoustic damping pipe cover on the water pipe but hold the pipe cover in a sliding fashion. The acoustic damping pipe cover is lightweight and easy to manipulate, and provides an excellent acoustic damping performance.

6 Claims, 3 Drawing Sheets

ACOUSTIC DAMPING PIPE COVER

BACKGROUND OF THE INVENTION

(1) Field of the Invention

This invention generally relates to a tubular acoustic damping pipe cover to be used on a pipe for a water supply/drainage system or air-conditioning system of a building, which is lightweight and excellent in manipulation and acoustical damping performance.

(2) Background Art

There are ever increasing demands of late for a quieter water supply/drainage system backed by general demands for quieter living environments.

There has been introduced a multi-layered acoustic damping structure comprising a sound insulation layer such as an asphaltic sheet and a sound absorptive layer such as a sheet-like air cushion bag, glass wool sheet or felt sheet.

In order to improve the acoustic damping performance of such an acoustic damping structure, it has been conventionally attempted to increase the material density per area (to be referred to as "area density" throughout the specification and claims for convenience) of the sound insulation layer and/or the thickness of the sound absorptive layer.

To conventionally provide the sound insulation layer with a sufficient sound insulation property, the area density of the sound insulation layer need be 5.0–10.0 kg/m2 or over, which will make the sound insulation layer too heavy to conveniently handle and too thick to be used conventionally on a water pipe, thus impractical.

To conventionally provide the sound absorptive layer with a sufficient sound absorptive property, the thickness of the sound absorptive layer is required to be 10.0–20.0 mm or over, which is too thick to be conventionally used on a water pipe, thus impractical.

It will be readily appreciated that a conventional acoustic damping structure incorporating such a heavy and thick sound insulation layer and such a thick sound absorptive layer is impractical, though it may provide a satisfactory acoustic damping performance.

Accordingly, it is an object of the present invention to provide a laminated acoustic damping pipe cover which is lightweight, easy to manipulate and capable of providing an excellent acoustic damping performance.

It is another object of the present invention to provide a tubular acoustic damping pipe cover which is ready to be applied on a water pipe.

Other objects of the present invention will be appreciated from the description of this specification.

It should be noted that "pipes" used throughout the specification and claims such as a water supply pipe or water drainage pipe where the acoustic damping pipe cover of the present invention is to be applied are intended to include other types of pipes which produce sounds or noises that are desired to be reduced or damped.

SUMMARY OF THE INVENTION

A laminated acoustic damping pipe cover of the present invention, which is lightweight, easy to handle and excellent in acoustic damping performance, is generally and basically comprised of a sound insulation layer having an area density of 1.5–5.0 kg/m2 and a sound absorptive layer having a thickness of 4.0–10.0 mm, with a thin heat-contractile layer covering the sound insulation layer, where the heat-contractile layer is to be the outermost layer, and the sound absorptive layer is generally to be the innermost layer, with the sound insulation layer being sandwiched therebetween.

The laminated acoustic damping pipe cover of the present invention, which is basically provided in a form of a "tubular" pipe, is provided on a water pipe. Then the outermost heat-contractile layer is heat treated or heated to contract so that the acoustic damping pipe cover is provided on the pipe tightly and securely enough. It is important and advantageous that the acoustic damping pipe cover is still capable to slide somehow on he water pipe so as to assist in manipulation during its installment and setting. Use of an adhesive is therefore not required for the purpose of securely holding the acoustic damping pipe cover on the water pipe, which further improves the maneuverability and workability of the acoustic damping pipe cover.

The acoustic damping pipe cover of the present invention may further comprise, if and as desired, a vibration damping layer and/or vibration insulation layer so as to further improve its acoustic damping performance.

The sound insulation layer may be selectively formed from a variety of materials as long as its area density is held within 1.5–5.0 kg/m2. The sound absorptive layer may be advantageously formed of recycled urethane chips to reduce the manufacturing costs. The thin heat-contractile layer or film may be formed of polyvinyl chloride, polyethylene, polyester, polypropylene or polystyrene among others. Any other suitable material can be used to manufacture the hat-contractile layer as long as it provides a suitable heat shrinkage and is durable and strong.

The acoustic damping pipe cover of the present invention is basically provided in a tubular configuration so that it can be readily applied on a tubular pipe.

DETAILED DESCRIPTION OF EMBODIMENTS

Figure 1:
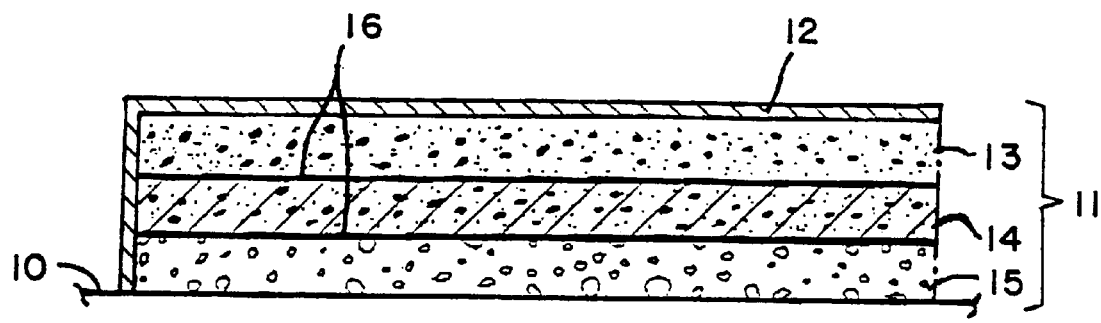
FIG. 1 is a sectional view partially showing the lamination of an acoustic damping pipe cover according to an embodiment of the present invention.

As FIG. 1 partially shows, an acoustic damping pipe cover 11 prepared according to an embodiment of the present invention comprises a thin heat-contractile layer 12, sound insulation layer 13, vibration damping layer 14 and sound absorptive layer 15.

It is important to note here that an acoustic damping pipe cover of the present invention may basically comprise a thin heat-contractile layer 12, sound insulation layer 13 and sound absorptive layer 15 only.

The sound insulation layer 13 has an area density of 1.5–5.0 kg/m2. Although the sound insulation layer 13 may be virtually of any appropriate material as long as it possesses an area density within 1.5–5.0 kg/m2, the sound insulation layer 13 may preferably be prepared from a vinyl chloride polymer, a vinyl chloride copolymer obtained by random copolymerization or block copolymerization with at least one monomer capable of copolymerization with a vinyl chloride monomer such as a vinyl acetate-vinyl chloride copolymer, ethylene-vinyl chloride copolymer or vinylidene chloride-vinyl chloride copolymer, or a vinyl chloride graft copolymer obtained by graft copolymerization with a resin capable of graft copolymerization with a vinyl chloride monomer such as an ethylene-vinyl acetate-vinyl chloride graft copolymer or polyurethane-vinyl chloride graft copolymer.

As set forth, the sound insulation layer 13 should possess an area density within the range "1.5–5.0 kg/m2". If the area density is below 1.5 kg/m2, the sound insulation performance of the sound insulation layer 13 will be insufficient, and if the area density is over 5.0 kg/m2, the sound insulation layer 13 will be too heavy and too thick to practically utilize on a pipe and its manipulation and workability will be poor.

Into the material of the sound insulation layer 13 may be blended a filler as desired such as calcium carbonate, talc, magnesium carbonate, alumina, titanium oxide, baryte, iron oxide, zinc oxide or graphite so as to further improve the sound insulation property of the layer 13. Such a filler is advantageously blended in the sound insulation layer 13 in the range 50–95 wt. % of the total weight so as not to excessively and negatively affect the mechanical strength of the layer 13. Such a filler may also be utilized to desirably adjust the viscosity of the sound insulation layer 13 and/or to reduce the manufacturing costs.

The sound absorptive layer 15 should advantageously possess a thickness of 4.0–10.0 mm. The sound absorptive layer 15 may be made of a resin material as a base selectively prepared from urethane, chloroprene, styrene-butadiene copolymer, polyethylene, polypropylene, ethylene vinyl acetate and styrene.

The sound absorptive layer 15 will not provide sufficient sound absorption if the thickness is below 4.0 mm. On the other hand, the sound absorptive layer 15 having over 10.0 mm in thickness will be too thick and too heavy to be practical.

The sound absorptive layer 15 may be provided with a continuous-cell structure in order to further improve its sound absorption property.

When the sound absorptive layer 15 is to be provided with a foam structure, the expansion rate for the foaming is advantageously in the range 10–50 times.

The sound absorptive layer 15 may alternatively be provided with mechanical holes or slits to still further improve its sound absorptive property.

It is to be noted again that the acoustic damping pipe cover 11 of the invention is advantageously formed in a tubular configuration so as to be readily applied on a tubular pipe.

It is also noted again that the laminated acoustic damping pipe cover 11 of the present invention may basically comprise only a thin heat-contractile layer 12, sound insulation layer 13 and sound absorptive layer 15 without the vibration damping layer 14. Therefore, it is an option to additionally incorporate the vibration damping layer 14 between the sound insulation layer 13 and the sound absorptive layer 15 so as to efficiently damp vibrations that can travel as "sound".

Such an additional layer may be a vibration insulation layer so as to effectively insulate vibrations that can otherwise travel as "sound".

The vibration damping layer 14 may be made of a resin material such as a blend of a vinyl chloride resin and a rubber. Such a rubber may be acrylonitrile butadiene rubber (NBR), styrene butadiene rubber (SBR), butadiene rubber (BR), natural rubber (NR) or isoprene rubber (IR). Such a rubber is blended in a selected resin in the range 10–80 wt. % of the total weight.

A filler such as those set forth earlier may also be selectively incorporated in the vibration damping layer 14 so as to improve the vibration damping property of the vibration damping layer 14.

When incorporated in the acoustic damping pipe cover of the invention, the vibration insulation layer (not shown) may be sandwiched between the sound insulation layer 13 and vibration damping layer 14, between the vibration damping layer 14 and sound absorptive layer 15, or between the sound insulation layer 13 and sound absorptive layer 15 in replacement of the vibration damping layer 14.

Alternatively, the vibration insulation layer may be provided under the sound absorptive layer 15 in contact with the water pipe 10. The vibration damping layer 14 may be provided under the sound absorptive layer 15, instead of between the sound insulation layer 13 and sound absorptive layer 15. Other lamination arrangements may also be possible and practical.

It is to be noted that any of such layers may be incorporated in a plurality instead of just one and laminated with other layers in a desired lamination arrangement.

The vibration insulation layer may be prepared of a rubber material as a chief ingredient, such as acrylonitrile butadiene rubber (NBR), styrene butadiene rubber (SBR), butadiene rubber (BR), natural rubber (NR) or isoprene rubber (IR), or their selective blends with an appropriate polymer material.

The vibration insulation layer may also contain a filler such as carbon black or calcium carbonate to appropriately adjust the hardness of the vibration insulation layer.

The thickness of the vibration damping or insulation layer may be selected as appropriate as long as the total thickness of the acoustic damping piper cover is kept within an appropriate and practical range.

The sound insulation layer 13 and the vibration damping layer 14 may be together provided as an integrated layer such as disclosed in Japanese Patent Laid-Open Publication No. 8-73648. Such an integrated sound insulation/vibration damping layer may comprise a vinyl chloride resin matrix and mica flakes and/or calcium carbonate blended and dispersed evenly in the resin matrix to improve the sound insulation/vibration damping properties.

The layers of the acoustic damping piper cover 11 of the present inventions are advantageously adhered to one another with an appropriate adhesive, however, the outermost heat-contractile layer or film 12 is not adhered to the layer directly therebelow. The innermost layer is not adhered to the water pipe. FIG. 1 shows such adhesive layers 16.

The thin heat-contractile layer 12 is made of a heat-contractile polymer material such as polyvinyl chloride, polyethylene, polyester, polypropylene or polystyrene.

When the acoustic damping pipe cover 11 is provided in a tubular configuration, a water pipe is inserted into the tubular acoustic damping pipe cover 11 from an opening of the pipe cover 11.

If the acoustic damping pipe cover 11 is provided in a sheet configuration, then the sheet 11 will be wrapped around a water pipe to be secured in position with appropriate securing means such as an adhesive tape.

Then the acoustic damping pipe cover 11 is heat treated so that the outermost thin heat-contractile layer 12 is contracted to squeeze or tighten the pipe cover 11 on the water pipe. The shrinkage of the heat-contractile layer 12 is so controlled that the acoustic damping pipe cover 11 may still be capable of sliding somewhat on the pipe.

Figure 2:
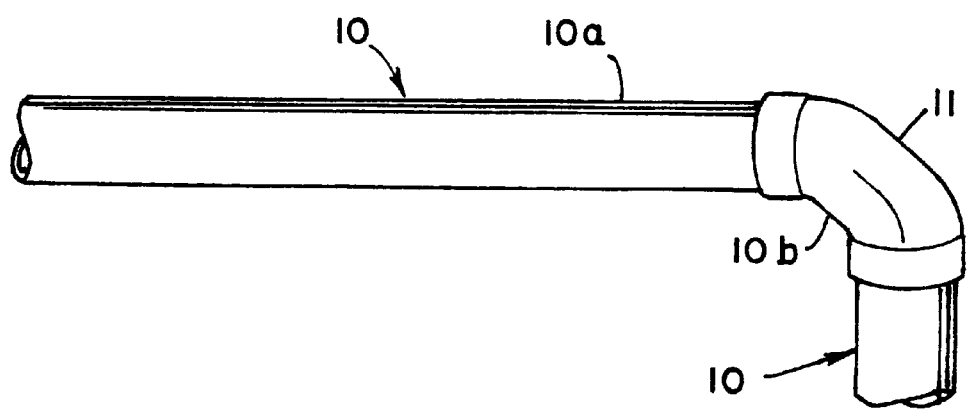
FIG. 2 shows a use on pipes of an acoustic damping pipe cover of the present invention.

FIG. 2 shows an example of actual use of the acoustic damping pipe cover 11 of the present invention. Two water pipes 10 are connected at right angles with a corner pipe (not shown) covered with a tubular acoustic damping pipe cover 11. The angled connection where the acoustic damping pipe cover 11 is provided is the place where normally high noise levels are observed. The acoustic damping pipe cover 11 of the present invention will greatly reduce such high-level noises.

Figure 3:
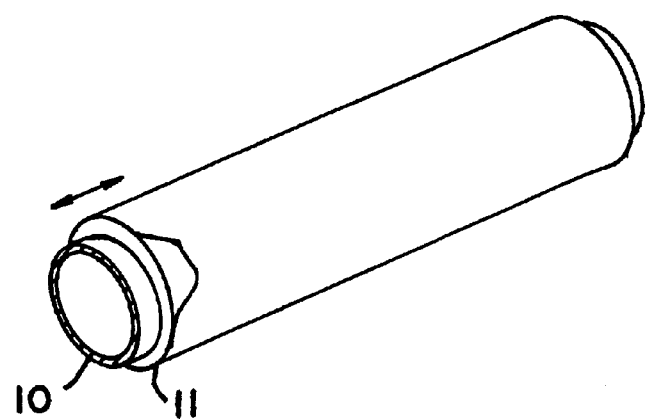
FIG. 3 shows another application on a pipe of an acoustic damping pipe cover of the present invention.

As set forth earlier, the acoustic damping pipe cover 11 is "slidably" provided on a pipe 10 as indicated by a dual arrow in FIG. 3, where an end portion of the pipe 10 is exposed. Both ends of the pipe 10 may be exposed, if so desired. The exposed end portion of the pipe 10 can be utilized for connection with another pipe (not shown).

The acoustic damping pipe cover 11 of the present invention may be heat-treated and slidably provided on a pipe 10 during the manufacturing processes so that when cutting of the pipe 10 is required at a work place, the acoustic damping pipe cover 11 is slid in one direction on the pipe 10 so as to avoid damaging onto the acoustic damping pipe cover 11. As the acoustic damping piper cover 11 can slide on a pipe 10, a plurality of acoustic damping pipe covers 11 may be arranged on a pipe or pipe line in tight contact with one another so that noises do not escape or leak from the gaps between the acoustic damping pipe covers 11.

In the following are provided the data obtained through the testing conducted for the acoustic damping performances using various types of tubular acoustic damping pipe covers or samples 1–16 prepared according to the present invention.

Figure 4:
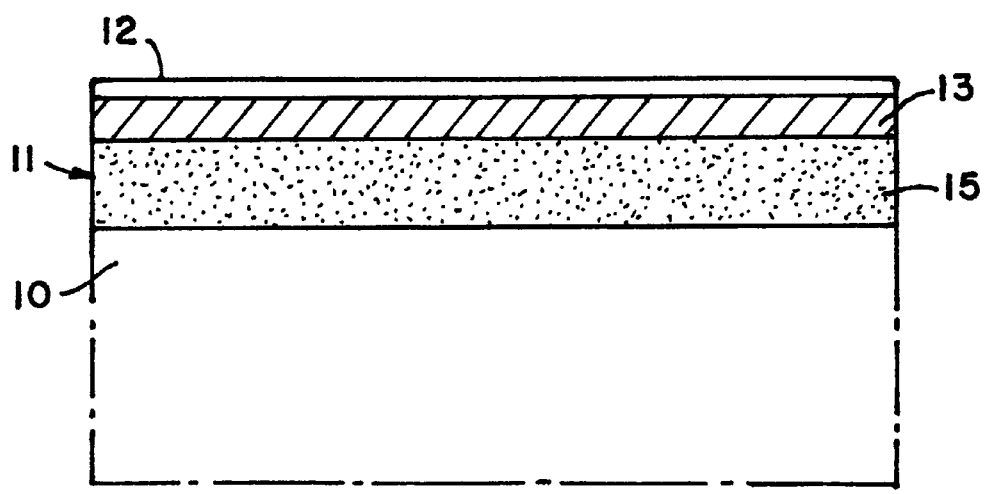
FIG. 4 is a sectional view showing the lamination of an acoustic damping pipe cover as used on a pipe according to another embodiment of the present invention.

Each of the tubular samples 1–16 was a laminate body 11 as partially shown in FIG. 4, comprising a sound insulation layer 13 (2 mm thick) of a vinyl chloride resin matrix and barytes blended in the matrix, and a sound absorptive layer 15 (area density 0.05 kg/m2) of molded chips prepared from crushed urethane (Inoack Corporation), over which is provided a thin heat-contractile film 12 as an outermost layer.

A pipe 10 (partially shown) was inserted into each tubular laminate sample 11. Then each laminate sample 11 was heat treated so as to constrict the laminate sample 11 on the pipe 10 such that the laminate sample 11 could be tightened (though slidable) on the pipe 10.

Table 1 provides the thickness of each sound absorptive layer 15 and the area density of each sound insulation layer 13 respectively incorporated in the samples 1–16. "ADSIL" stands for the "area density of sound insulation layer" and "TSAB" stands for the "thickness of sound absorptive layer".

TABLE 1

| TSAB (mm) | ADSIL (kg/m2) | | | |
| --- | --- | --- | --- | --- |
|  | 1.55 | 1.75 | 2.50 | 5.00 |
| 4 | Sample 1 | Sample 2 | Sample 3 | Sample 4 |
| 5 | Sample 5 | Sample 6 | Sample 7 | Sample 8 |
| 7 | Sample 9 | Sample 10 | Sample 11 | Sample 12 |
| 10 | Sample 13 | Sample 14 | Sample 15 | Sample 16 |

Figure 5:
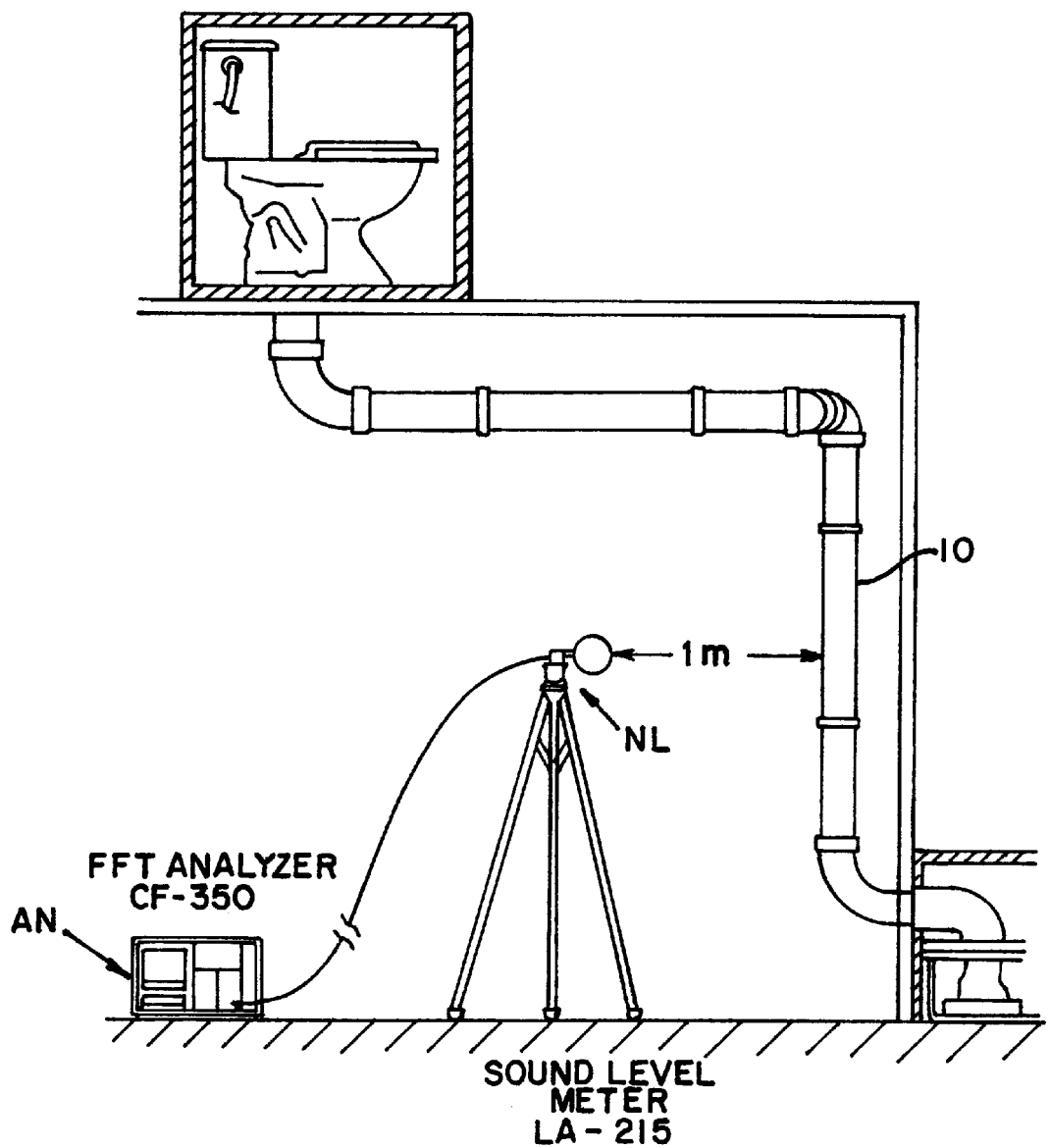
FIG. 5 shows an installation of a pipe system where acoustic damping pipe covers of the present invention are utilized.

The pipes 10 respectively covered with the tubular samples 1–16 were installed one test after another as shown in FIG. 5, and their respective noise or sound levels were measured with a sound level meter NL (LA-210; Ono Sokki Kabushiki Kaisha) which was placed 1 m apart from the samples as shown in FIG. 5. The noise level values as provided by an FFT analyzer AN (CF-350; Ono Sokki Kabushiki Kaisha) are presented in Table 2.

"Handling" indicates degrees of easiness of handling of the test pieces 1–16 including "portability" and "flexibility". "Workability" indicates degrees of easiness of installation of the pipes respectively covered with the tubular samples 1–16. Both degrees were evaluated in three levels "A", "B" and "C", where "A" indicates "excellent", "B" indicates "good" and "C" indicates "poor".

TABLE 2

| Sample | Noise Level (dB) | Handling | Workability |
| --- | --- | --- | --- |
| 1 | 9.8 | A | A |
| 2 | 11.2 | A | A |
| 3 | 12.3 | A | A |
| 4 | 14.2 | B | A |
| 5 | 10.3 | A | A |
| 6 | 11.7 | A | A |
| 7 | 12.8 | A | A |
| 8 | 14.7 | B | A |
| 9 | 11.9 | A | A |
| 10 | 13.3 | A | A |
| 11 | 14.4 | A | A |
| 12 | 16.3 | B | A |
| 13 | 13.2 | A | B |
| 14 | 14.6 | A | B |
| 15 | 15.7 | A | B |
| 16 | 17.6 | B | B |

For comparison, a pipe that was exposed (not covered with an acoustic damping pipe cover of the present invention) was also tested under the identical test conditions for its noise level. The measurement provided 54 dB, which was by far greater than any measurement for the test samples 1–16. It is evident from the testing that the acoustic damping pipe covers 11 of the invention greatly contributed in reduction of noise levels.

Also, other control samples whose sound insulation layers had an area density over 5 kg/m2 were analyzed. Their "handling" performances were all evaluated "C".

Still other control samples whose sound absorptive layers had a thickness over 10 mm were also analyzed. Their "workability" performances were all evaluated "C".

It is therefore concluded that the acoustic damping pipe cover of the present invention can excellently reduce or damp noises when applied on a water drainage/supply pipe or any noise producing pipe. In addition, the acoustic damping pipe cover of the present invention is easy to manipulate and its applicability on a pipe is excellent.

The present invention has been described using several embodiments, however, it is to be understood that such embodiments can be modified within the scope of the appended claims.

What is claimed is:

1. A laminated tubular acoustic damping pipe cover to be used on a pipe, comprising:
    a sound insulation layer whose area density is 1.5–5.0 kg/m2;
    a sound absorptive layer whose thickness is 4.0–10.0 mm, which is held fixed relative to said sound insulation layer; and
    a loosely provided outermost heat-contractile cover layer, said heat-contractile cover layer to be heat treated so as to shrink and tighten but hold the acoustic damping pipe cover on the pipe in a sliding fashion.

2. A laminated tubular acoustic damping pipe cover according to claim 1, further comprising a vibration damping layer which is fixed relative to said sound insulation layer.

3. A laminated tubular acoustic damping pipe cover according to claim 1, further comprising a vibration insulation layer which is fixed relative to said sound insulation layer.

4. A laminated tubular acoustic damping pipe cover according to claim 1, wherein said sound absorptive layer is made from recycled urethane chips.

5. A laminated tubular acoustic damping pipe cover according to claim 1, wherein said heat-contractile layer is made from a resin material selected from the resin group consisting of polyvinyl chloride, polyethylene, polyester, polypropylene and polystyrene.

6. A laminated tubular acoustic damping pipe cover according to claim 1, wherein the acoustic damping pipe cover is provided in a size that exposes a length of end portion from each end of said pipe.

* * * * *